United States Patent Office 3,290,176
Patented Dec. 6, 1966

3,290,176
ELECTRIC STORAGE BATTERY ELECTROLYTE CIRCULATOR DEVICE
Klaus K. Berju and Elmer M. Strohlein, both of Philadelphia, Pa., assignors to The Electric Storage Battery Company, a corporation of New Jersey
Filed May 16, 1966, Ser. No. 550,505
9 Claims. (Cl. 136—160)

This patent application is a continuation-in-part of U.S. patent application Serial No. 380,755, filed July 7, 1964 and now abandoned.

This invention relates to an electric storage battery electrolyte circulator device. In particular, the invention relates to a battery electrolyte circulator device which is designed to function as a cooling system and also as a support means for the battery element.

It is well known in the electric storage battery art that the alkaline electrolyte in a silver-zinc battery must be circulated in order to obtain maximum battery efficiency. This is particularly true in large silver-zinc batteries which operate on a limited amount of electrolyte. In this type of battery, either the positive or negative electrodes are enclosed in separator envelopes of semipermeable material, e.g., cellophane, which retard the circulation of electrolyte. During charging and discharging of the battery, the concentration of the alkaline electrolyte changes, and the quantity of electrolyte available to the separator-enclosed electrodes decreases which adversely affects the operation of the battery. To overcome this problem, the separator envelopes are left open at the top giving the electrolyte access to the enclosed electrode. Periodically during the operation of the battery, the electrolyte level is raised above the top of the separator envelopes and the electrolyte spills into the envelopes. This results in increased electrolyte circulation due to the additional electrolyte within the envelopes.

It is an object of this invention to provide an improved battery electrolyte circulator device.

Another object of the invention is to provide a battery electrolyte circulator device which also functions as a support for the battery element.

Figure 1:
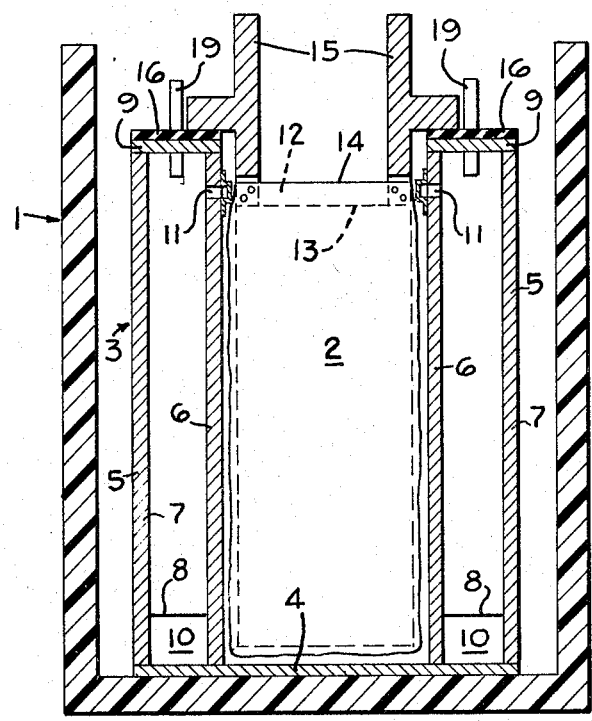
Figure 2:
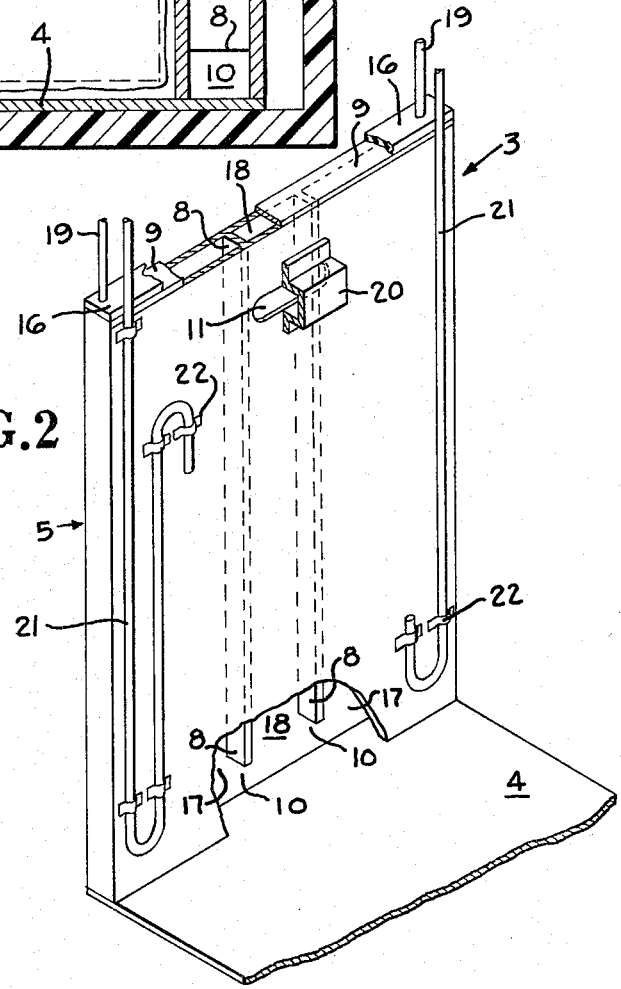

Other objects and advantages of this invention will be apparent to those skilled in the art in view of the description which follows, and particularly in view of the drawings in which:

FIGURE 1 is a cross sectional view of a battery containing an electrolyte circulator device in accordance with this invention; and FIGURE 2 is an elevational view of one-half of a battery electrolyte circulator device of this invention with portions broken away to more clearly illustrate the device.

It has been discovered that an electric storage battery electrolyte circulator device can be designed so as to function as a battery cooling system and also as a battery element support in addition to functioning as an effective electrolyte circulator. The electrolyte circulator device of this invention is an unbreakable electrolyte reservoir which is prepared from an electrolyte resistant metal such as stainless steel. Since the circulator device is metallic, it has sufficient strength to support the battery element, i.e., positive and negative electrodes and separators, for the element straps can be placed upon the top of the circulator device.

The circulator device is U-shaped, with the bottom resting on the bottom of the battery container, and the two upstanding sides enclosing two sides of the battery element. The interior wall of the two upstanding sides serves as a base on which a cooling coil may be mounted, and a coolant circulated through the coil to remove heat generated during the operation of the battery. If a short circuit develops within the battery during its operation, a tremendous amount of heat will be avoided, and the circulator device of this invention helps to contain the heat within the battery by acting as a heat shield on two sides and the bottom of the battery and also by removing heat through the cooling coil. If desired, two circulator devices can be used in the same battery and arranged so that all four sides of the battery element are enclosed by the two circulator devices.

As previously indicated, the circulator device is U-shaped and has a flat bottom which rests upon the bottom of the battery container. The two upstanding sides are perpendicular to the bottom and are hollow so as to form electrolyte reservoirs. Each upstanding side is divided into three compartments by means of two partitions which extend from the top cover plate almost to the bottom. There is a small space below each partition which interconnects the compartments, permits electrolyte to flow between the outer compartments and the middle compartment, and provides an identical electrolyte level in all three compartments.

During the operation of the battery, the circulation system is periodically activated by pumping air into the outer compartments of both electrolyte reservoirs. The increased air pressure above the electrolyte in the outer compartments forces the electrolyte into the middle compartments. An aperture in the upper part of the middle compartment connects them with the battery container, and the electrolyte which is forced into the middle compartment forces electrolyte through the aperture into the battery container. This raises the electrolyte level in the battery container sufficiently to cause electrolyte to spill into the separator envelopes and irrigate the electrodes therein. When the air pressure is relieved, electrolyte returns into the reservoirs through the apertures which now function as an automatic electrolyte leveling device, maintaining the eletrolyte level between the top of the separators and the top of the electrode plates.

A more detailed description of the circulator device of this invention is available by referring to the drawings. FIGURE 1 is a cross sectional view of a battery containing an electrolyte circulator device of this invention. In FIGURE 1, a battery container 1 contains a battery element 2, which includes positive electrodes, negative electrodes and separators, and a circulator device 3. The circulator device comprises a flat bottom piece 4 and two upstanding sides 5 perpendicular to the bottom, said sides having an interior wall 6 and an exterior wall 7. The upstanding sides are divided into compartments by partitions 8 which extend from the top cover plate 9 to near the bottom of the upstanding sides. There is a small space 10 beneath each partition which interconnects the compartments. Near the top of the middle compartment of both upstanding sides is an aperture 11 located in the interior wall 6 of the upstanding side which permits the flow of electrolyte from the middle compartment into the battery container and back into the middle compartment. It should be noted that a portion 12 of the separator envelopes extends above the electrode plates, and the aperture 11 is located between the top of the plates 13 and the top of the separator envelopes 14 so as to maintain the electrolyte above the plates but below the top of the envelopes.

Another feature of this invention is the utilization of the circulator device 3 as a support for the battery element 2. The electrode plates are bolted to connector straps 15 which are placed on the plastic insulating material 16 which covers the top cover plates 9 of the circulator device. The electrolyte resistant plastic material 16 separates or insulates the electrode plates from the metallic circulator device and thereby prevents short circuiting of the battery. In this manner the battery element may be supported so as to provide a space below the electrode plates without requiring additional means to support the battery element.

The circulator device of this invention is symmetrical, and FIGURE 2 is an elevational view of one-half of a battery electrolyte circulator device. Parts identical to those shown in FIGURE 1 are given the same numerical designation in FIGURE 2. FIGURE 2 clearly illustrates the dividing of the upstanding side 5 into three compartments, the two outer compartments 17 and the middle compartment 18, by means of the two partitions 8. The spaces 10 below the partitions to provide for electrolyte flow from the outer compartments to the middle compartment are clearly shown. The air inlets 19 which project through the top cover plate 9 are provided to increase the air pressure above the electrolyte in the outer compartments 17 which forces the electrolyte into the middle compartment 18 and out into the battery container through the aperture 11. It should be noted that the plastic insulating material 16 has holes provided therein to receive the air inlets 19 and to enable it to be placed on top of and in contact with top cover plate 9. One of the advantages of the circulator device of this invention is that a very low air pressure, e.g., ½ p.s.i., can be used to force the electrolyte into the battery container. It may be desirable to cover each aperture 11 with a baffle plate 20 which prevents the direct impingement of electrolyte upon the battery element.

An additional feature of this invention is illustrated in FIGURE 2. As previously stated, the circulator device 3 can serve as a base on which a cooling system can be mounted. In FIGURE 2, a cooling coil tube 21 is attached to the interior wall 6 of the upstanding side 5 by means of metal clips 22 which are welded to the upstanding side. Water or some other coolant is passed through the tubing 21 to cool the electrolyte which becomes hot due to heat generated during the operation of the battery. It is generally preferred to attach the cooling system to the interior walls of the upstanding sides as shown in FIGURE 2, but if desired, the cooling coil may be attached to the exterior wall 7 or incorporated within the compartments.

Having completely described this invention, what is claimed is:

1. A metallic electrolyte circulator device for use in an electric storage battery which comprises a U-shaped structure having a flat bottom, two upstanding sides perpendicular to the bottom, both upstanding sides having an interior wall and an exterior wall and being divided into three compartments by two partitions extending from a top cover plate which covers each upstanding side to near the bottom of the upstanding sides, a small space beneath each partition which interconnects the compartments, an aperture located in the interior wall near the top of the middle compartment of both upstanding sides, and gas inlet means projecting through the top cover plate into the outer compartments of both upstanding sides.

2. An electrolyte circulator device in accordance with claim 1 in which a coil tubing is attached to the interior wall of both upstanding sides.

3. An electrolyte circulator device in accordance with claim 2 in which there is a baffle plate placed over the aperture in the middle compartments.

4. An electric storage battery having a battery element comprising positive electrodes, negative electrodes and separators, a battery electrolyte, and a metallic electrolyte circulator device which comprises a U-shaped structure having a flat bottom resting upon the bottom of the battery container, two upstanding sides perpendicular to the bottom, both upstanding sides having an interior wall and an exterior wall and being divided into three compartments by two partitions extending from a top cover plate which covers each upstanding side to near the bottom of the upstanding sides, said top cover plates being covered by a plastic insulating material, a small space beneath each partition which interconnects the compartments, an aperture located in the interior wall near the top of the middle compartment of both upstanding sides, and gas inlet means projecting through the top cover plate into the outer compartments of both upstanding sides.

5. An electric storage battery in accordance with claim 4 in which said battery element is connected to straps which rest upon the plastic insulating material which covers the top cover plates and are supported by the circulator device in such a manner as to provide a clearance space between the bottom of the electrodes and the bottom of the circulator device.

6. An electric storage battery in accordance with claim 5 in which the separators of said battery element are envelopes whose open tops extend beyond the tops of the electrode plates, and the bottom edge of the aperture in the middle compartment is located above the top edge of the electrode plates but below the top of the separator envelopes.

7. An electric storage battery in accordance with claim 6 in which a coil tubing is attached to the interior wall of both upstanding sides, said tubing being located between the battery element and the upstanding sides.

8. An electric storage battery in accordance with claim 7 in which there is a baffle plate placed over the aperture in the middle compartment.

9. An electric storage battery in accordance with claim 8 in which the positive electrodes contain silver active material, the negative electrodes contain zinc and the electrolyte is an alkaline solution.

References Cited by the Examiner

UNITED STATES PATENTS

| 2,584,117 | 2/1952 | Elrod | 136—159 |
| 2,932,681 | 4/1960 | Solomon | 136—160 |
| 3,110,633 | 11/1963 | Bachmann | 136—161 |

WINSTON A. DOUGLAS, *Primary Examiner.*

D. L. WALTON, *Assistant Examiner.*